United States Patent [19]

Ireland

[11] Patent Number: 5,302,307
[45] Date of Patent: Apr. 12, 1994

[54] LIQUID ANTICORROSIVE AND ANTISCALING DEICING COMPOSITION

[75] Inventor: Donald T. Ireland, Delano, Minn.

[73] Assignee: Cargill, Incorporated, Minneapolis, Minn.

[21] Appl. No.: 865,676

[22] Filed: Apr. 8, 1992

Related U.S. Application Data

[63] Continuation of Ser. No. 572,504, Aug. 23, 1990, abandoned.

[51] Int. Cl.$^5$ ................................................. C09K 3/18
[52] U.S. Cl. ......................................... 252/70; 106/13
[58] Field of Search ............................. 252/70; 106/13

[56] References Cited

U.S. PATENT DOCUMENTS

| | | | |
|---|---|---|---|
| 2,742,369 | 4/1956 | Hatch | 106/14 |
| 2,813,075 | 11/1957 | Brooke | 252/8.55 |
| 2,980,620 | 4/1961 | Hatch | 252/70 |
| 3,185,648 | 5/1965 | Standish et al. | 252/70 |
| 3,505,234 | 4/1970 | Pinckernelle et al. | 252/70 |
| 3,537,900 | 11/1970 | Halbert | 252/70 |
| 3,542,686 | 11/1970 | Miller | 252/70 |
| 3,623,992 | 11/1971 | Kolasinski | 252/70 |
| 3,772,202 | 11/1973 | Neitzel et al. | 252/70 |
| 3,833,504 | 9/1974 | Neitzel et al. | 252/70 |
| 3,849,171 | 7/1976 | Murray | 422/7 |
| 4,089,651 | 5/1978 | Scott | 21/2.7 |
| 4,134,959 | 1/1979 | Menke et al. | 422/16 |
| 4,202,796 | 5/1980 | Jacob | 252/389.2 |
| 4,358,389 | 11/1982 | König-Lumer et al. | 252/70 |
| 4,643,361 | 2/1987 | Chapman | 241/16 |
| 4,692,315 | 9/1987 | Greaves et al. | 422/18 |
| 4,803,007 | 2/1989 | Garber | 252/70 |
| 4,938,891 | 7/1990 | Lenack et al. | 252/77 |
| 4,978,500 | 12/1990 | Murray | 422/7 |

FOREIGN PATENT DOCUMENTS

| | | |
|---|---|---|
| 804086 | 12/1993 | Belgium . |
| 976336 | 10/1973 | Canada . |
| 1105389 | 7/1981 | Canada . |
| 0035798 | 9/1981 | European Pat. Off. . |
| 180568 | 5/1986 | European Pat. Off. . |
| 3028372 | 2/1982 | Fed. Rep. of Germany . |
| 3028372 | 2/1982 | Fed. Rep. of Germany . |
| 156918 | 9/1982 | Fed. Rep. of Germany . |
| 3208219 | 9/1983 | Fed. Rep. of Germany . |
| 3208219 | 9/1983 | Fed. Rep. of Germany . |
| 3229654 | 2/1984 | Fed. Rep. of Germany . |
| 3229654 | 2/1984 | Fed. Rep. of Germany . |
| 56-51969 | 5/1981 | Japan . |
| 58-42773 | 3/1983 | Japan . |
| 58-42773 | 3/1983 | Japan . |
| 60-195178 | 10/1985 | Japan . |
| 61-141867 | 6/1986 | Japan . |
| 63-117089 | 5/1988 | Japan . |
| 63-117089 | 5/1988 | Japan . |
| 63-225686 | 9/1988 | Japan . |
| 482488 | 6/1977 | U.S.S.R. . |
| 1249057A | 8/1984 | U.S.S.R. . |
| 1328509 | 8/1973 | United Kingdom . |
| 1505816 | 3/1978 | United Kingdom . |

OTHER PUBLICATIONS

Translation of Japanese Patent 63-117089, May 21, 1988.

The Corrosion and Oxidation of Metals, Evans, Edward Arnold Publishers, Ltd., (1960).

Scale Control in Sea Water Evaporators by Mulford, Abstract U.S. Dept. of the Interior (1964).

Eliminating Red Water With Bi-Metallic Glassy Phosphate by Powers et al. (Presented at the Chemists' Session, New England Water Works Assoc. Meeting, Dec. 1965), no month available.

Reducing Corrosion In Domestic Systems—Polyphosphate Inhibitors In Potable Water, Hatch, Materials Protection 31-39, (Nov. 1969).

(List continued on next page.)

Primary Examiner—Christine Skane
Attorney, Agent, or Firm—Fitch, Even, Tabin & Flannery

[57] ABSTRACT

A liquid deicing composition comprising MgCl$_2$ or bittern and an organic inhibitor selected from the group consisting of triethanolamine, triethanolamine acid salts, citric acid, metal salts of citric acid and mixtures thereof.

16 Claims, No Drawings

OTHER PUBLICATIONS

Road Research Laboratory Report LR 268, Ministry of Transport, UK, by D. E. Steed (1969).

The Effect of Polyphosphate on Corrosion, Sverepa Neue Huette (New Foundry), vol. 15, pp. 733-735 (1970).

Influence of Movement and Temperature on the Corrosion of Mild Steel IV Inhibition by sodium metaphosphate glass, Butler et al., Br. Corros., J. 6 pp. 155-163 (1971).

Transport and Road Research Laboratory Report 489, by Bishop (1972).

Corrosion Control in Circulating Water System, Verma et al., Fertilizer Techology 12, pp. 337-340.

UK Research Aimed to Reduce Motor Vehicle Corrosion Caused by Highway Deicing Salt by Bishop, Materials Performance, 15-20 (Presented during Corrosion/76, Mar. 22-26, 1976, Houston, Tex.).

Inhibition of Mild Steel by Polyphosphates, Lahodny-Sarc et al., Corrosion Science 16, 25-134 (1976).

The Influence of Calcium 45 on the Inhibitive Effect of Calcium Hexameta Phosphate, etc., Subramanyan et al., Transactions of SAEST vol. 143, No. 3 (1978).

Corrosion of Iron in Natural Waters: Inhibition and the Use of Monitoring Techniques, Allen Br. Corros. J. 14, pp. 84-90 (1979).

Corrosion and Corrosion Inhibition of Steel in Tap Water, El Hosary et al., Egypt J. Chem. 23, pp. 67-70 (1980).

The Effect of Polymeric Dispersants on Corrosion Inhibition of Mild Steel, Hansen Annu. Meeting Int'l. Water Conf. 41st Pittsburgh, Pa. Oct. 1980.

Studies on the Performance of Non-Chromate Inhibitors in Fertilizer Plants, Verma, Fertilizer Technology 19, pp. 198-203 (1982).

Inhibiting The Process of Salt Deposition, Corrosion & Corrosion Fatigue of Steel In Neutral Media, Mikhailovoskii et al., Fizeko-Khimicheskaya Mekhanika Materialov, vol. 19 No. 5, pp. 95-98 (1983), no month available.

Treating and Monitoring Corrision & Scale in Distribution Systems, Boffardi et al., Water/Engineering & Management pp. 48-50, May 1984.

Non-Chromate Cooling Water Treatments-Operating Principles & Practice, Winters, Materials Performance, pp. 19-26 (Feb. 1985).

Method For Reducing Water Corrosivity In Circulating Water Systems of Petroleum Refineries, Sorochenko et al., Khiminyai Tekhnologiya Topliv i Masel, No. 9, pp. 11-14 (1985).

Evaluation of Silicate and Phosphate Compounds For Corrosion Control, Univ. of Missouri, Apr. 1987.

LIQUID ANTICORROSIVE AND ANTISCALING DEICING COMPOSITION

This application is a continuation of application Ser. No. 07/572,504 filed Aug. 23, 1990, now abandoned.

FIELD OF THE INVENTION

The present invention is directed to a liquid deicing composition and a method for utilizing the deicing composition. More particularly, the present invention is directed to a liquid deicing composition which comprises $MgCl_2$ and an organic inhibitor selected from the group consisting of triethanolamine, triethanolamine acid salts, citric acid, metal salts of citric acid and mixtures thereof. In another aspect of the invention, the deicing composition includes a combination of bittern and the aforedescribed organic inhibitor.

BACKGROUND OF THE INVENTION

Calcium chloride and alkali metal salts, such as sodium chloride, are extensively used in very large quantities on the roads of many countries for snow and ice removal. The use of calcium chloride or sodium chloride has, however, met with some resistance due to their corrosive effect on ferrous metal and deleterious effect on concrete. Aqueous solutions of NaCl are known to oxidatively corrode ferrous metal and cause scaling or surface damage to concrete. Indeed, data has been released suggesting that the cost of the damage associated with the widespread application of salt is approximately fourteen times the direct cost associated with the application of the salt; D. M. Murray, et al., *An Economic Analysis of the Environmental Impact of Highway Deicing,* U.S. Environmental Protection Agency, Cincinnati, Ohio, EPA-600/A-76-105 (May 1976). Accordingly, it would be highly desirable to provide a deicing composition which deices rapidly, has a reduced level of concrete damage, and reduces corrosion of ferrous metallic objects.

Various additives have been proposed for mixing with salt to aid in inhibiting corrosion caused by the salt. British Patent No. 1328509 to Bishop et al. describes a composition suitable for use in the inhibition of corrosion caused by salt, which includes a water-soluble polyphosphate and a surface active agent. The surface active agent is various amine compounds. In an article by E. E. Steed, *Road Research Laboratory,* Ministry of Transport, Report LR268-1969, polymetaphosphate inhibitors which require the presence of calcium ions are described to be effective as a corrosion inhibitor for brine solutions.

There is a serious need to provide a low cost deicing composition which reduces corrosion such as oxidative corrosion caused by aqueous solutions of deicer salts. Depending on cost, a deicing composition which reduces such corrosion or rust would be highly desirable for use on roadways where large quantities of the deicing composition are required. The present invention is directed to providing a liquid deicing composition which is suitable for highway and sidewalk use and which resists corrosion of ferrous metal.

Accordingly, one of the principle objects of the invention is to provide a liquid deicing composition which deices rapidly. Another object of this invention is to provide a liquid deicing composition which causes a reduced level of corrosion to ferrous metal. Still another object of this invention is to provide a deicing composition which limits the deleterious effects of deicing on concrete which are normally associated with deicing salts such as NaCl. Yet another important object of this invention is to provide a method for making a deicing composition by using bittern.

The term "bittern" refers to the mother liquor remaining after the evaporation such as by solar evaporation of seawater to produce sodium chloride. Seawater and brines from inland lakes have been evaporated in ponds by the heat of the sun since earliest times. Intake or tide ponds are flooded with seawater at high tide. Brine is transferred by pumping or gravity to a series of concentrating ponds and finally to the crystallizing ponds from which the salt harvesting is done by machinery which scrapes the salt from the crystallizing beds. Some of the bittern remaining after the crystallization of salt is used for the production of bromine and compounds of magnesium. However, most of the bittern is a waste by-product for which there is no use. Hence, an important aspect and object of this invention is to provide a new use for a heretofore useless waste by-product.

These and other objects of the invention will become apparent from the following description.

SUMMARY OF THE INVENTION

The present invention is directed to a liquid deicing composition comprising $MgCl_2$ in an effective amount for deicing a surface with frozen water thereon and an amount of organic inhibitor selected from the group consisting of triethanolamine, triethanolamine acid salts, citric acid, metal salts of citric acid and mixtures thereof. The organic inhibitor is present in an amount effective for the reduction of corrosion of ferrous metal by aqueous solutions of $MgCl_2$.

Another important aspect of the invention is a deicing composition which is a mixture of bittern in liquid form in an effective amount for deicing a surface with frozen water thereon and the organic inhibitor. In either aspect of the invention, the deicing composition not only is non-corrosive to ferrous metal, it reduces the scaling of or deleterious effects on concrete usually associated with deicer salts such as NaCl.

The present invention is also directed to a method for deicing a surface having frozen water thereon by applying the liquid deicing composition of the invention onto the surface of the ice.

DETAILED DESCRIPTION OF THE INVENTION

As used herein, liquid bittern, as the by-product of seawater and brines, generally includes from about 7.0 to 8.6 weight percent magnesium ion, from about 19 to about 22 weight percent chloride ion, from about 1 to 5 weight percent sulfate ion, from about 0.2 to about 2 weight percent sodium ion and from about 0.2 to about 2 weight percent potassium ion. Small quantities of bromine, iron and other soluble salts found in seawater also are present. Liquid bittern has total solids in the range of from about 26 to about 36%. Liquid bittern may be subjected to evaporation and drying to form dried liquid bittern liquid.

As used herein ferrous metal means iron or alloys of iron including steel which undergo corrosion or oxidation under ambient conditions.

According to the invention, the organic inhibitor used in combination with $MgCl_2$ reduces the corrosive effect on ferrous metal and scaling effect on concrete that are usually associated with the deicer salts such as NaCl or MgCl$_2$. The MgCl$_2$ may be in its hydrated form. In the aspect of this invention which utilizes bittern, the organic inhibitor is used in combination with liquid bittern.

As described herein the organic inhibitor may be liquid or solid and is selected from the group consisting of triethanolamine, triethanolamine acid salts, citric acid, alkali metal salts of citric acid and mixtures thereof. Acid salts may be obtained from triethanolamine by mixing the amine with any suitable acid such as HCl or HBr. Sodium citrate is an important citrate which may be used in the invention.

The effective ratio of the organic inhibitor to MgCl$_2$ can vary widely, and MgCl$_2$ should be in an amount effective for deicing. Aqueous MgCl$_2$ is commercially available as a 34% aqueous solution, that is 34 weight percent of the solution is MgCl$_2$. The following percentages of aqueous MgCl$_2$ are based upon the 34 weight percent aqueous solution. Generally, the liquid deicing composition of the invention is aqueous and at least about 95 weight percent of 34 weight percent aqueous MgCl$_2$ and at least about 95 to about 99.9 weight percent aqueous MgCl$_2$ (34%). The deicing composition contains at least about 0.1 weight percent organic inhibitor and preferably from about 0.1 to about 5.0 weight percent organic inhibitor.

In the aspect of the invention which includes the bittern/organic inhibitor combination, the liquid deicing composition contains an amount of liquid bittern effective for deicing such as at least about 95 weight percent and preferably from about 95 to about 99.9 weight percent liquid bittern, based upon the weight of the deicing composition; and at least about 0.1 weight percent and preferably from about 0.1% to about 5.0 weight percent organic inhibitor based upon the weight of the liquid deicing composition.

The final deicing composition of the present invention is provided by blending the MgCl$_2$ and the inhibitor with water or blending liquid bittern or dried liquid bittern liquid and organic inhibitor by combining the bittern and inhibitor in the desired weight ratio and blending them until a substantially homogeneous liquid mixture is obtained.

The resultant mixture which comprises the deicing composition is applied to a structure coated with ice or snow by any suitable means, such as by spraying.

The following examples further illustrate various features of the present invention, but are not intended to limit the scope of the invention which is set forth in the appended claims.

EXAMPLE I

The corrosivity of various deicers was measured by an alternate immersion corrosion test involving the use of 2"×3" S.A.E. 1010 carbon steel panels which were degreased in hexane and dried after a methanol rinse. The steel panels had a ¼" diameter hole drilled in the center and near the top of the 2" side. The panels had numbers stamped in each of them. All panels were weighed to the nearest tenth of a milligram after drying. Three percent by dry weight basis of deicer solutions were prepared in all cases except for plain water. Four panels were suspended by a rod pushed through the ¼" holes and separated by segments of rubber tubing. Each assembly was suspended in the water or 3% deicer solutions such that the panels were ½ immersed. During two 1 hour periods each work day the panels were suspended in air to achieve good contact with oxygen. The other 22 hours of each work day the panels were ½ immersed. Over weekends, panels were ½ immersed. At the end of each week, old solution was removed and replaced with new solution of the same type. At the end of one month the panels were removed and the solutions cleaned with 1820 g hot water, 180 g of concentrated hydrochloric acid and 2 g of Rodine 213. The panels were weighed and the percent protection against salt induced corrosion was calculated as follows:

% Protection Against Salt Induced Corrosion = 100 ×

$$\left( 1 - \frac{\text{Avg Wt Loss in Test Sol'n} - \text{Avg Wt Loss in Water} - \text{Avg Cleaning Wt Loss}}{\text{Avg Wt Loss in Salt Sol'n} - \text{Avg Wt Loss in Water} - \text{Avg Cleaning Wt Loss}} \right)$$

| Deicer Composition | Percent Protection Against Salt Caused Corrosion |
|---|---|
| Plain Water | 100.0 |
| Salt | 0.0 |
| 0.35% Triethanolamine, 99.63 Liquid Bittern | 86.1 |
| 0.294 Sodium Citrate, 99.706% Liquid Bittern | 82.2 |
| 0.15 Sodium Citrate, 0.18 Triethanolamine, 99.67% Liquid Bittern | 101.0 |
| 0.18% Triethanolamine, 99.82% Liquid Bittern | 93.7 |
| 0.10% Triethanolamine, 99.90 Liquid Bittern | 112.2 |
| 0.60% Sodium Citrate, 99.40% Liquid Bittern | 89.2 |
| 0.60% Triethanolamine Hydrochloride 99.4% Liquid Bittern | 92.4 |
| 0.30% Triethanolamine Hydrochloride, 99.7% Liquid Bittern | 95.4 |

All of the combinations of bittern and inhibitor provided substantial corrosion protection when compared to salt.

EXAMPLE II

The compositions descried below were tested as described in Example I.

| Deicer Composition | Percent Protection Against Salt Caused Corrosion |
|---|---|
| Plain Water | 100.0 |
| Plain Salt | 0.0 |
| Magnesium Chloride | 33.0 |
| 99.643% Bittern Liquid, 0.357% Triethanolamine | 141.0 |
| 99.706% Bittern Liquid, 0.294% Sodium Citrate | 144.0 |
| 99.67% Bittern Liquid, 0.15% Sodium Citrate, 0.18% Treithanolamine | 143.1 |
| 99.0% Bittern Liquid, 1.0% Triethanolamine | 136.1 |
| 99.9% Bittern Liquid, 0.1% Triethanolamine | 136.5 |
| 99.9% Bittern Liquid, 0.05% Triethanolamine 0.05% Sodium Citrate | 141.9 |
| 99.0% Bittern Liquid 1.0% Triethanolamine | 143.5 |

-continued

| Deicer Composition | Percent Protection Against Salt Caused Corrosion |
| --- | --- |
| 99.0% Bittern Liquid<br>1.0% Sodium Citrate | 143.5 |
| 99.0% Bittern Liquid,<br>0.05% Triethanolamine<br>0.05% Sodium Citrate | 144.2 |
| 99.85% Bittern Liquid<br>0.15% Sodium Citrate | 136.3 |
| 99.87% Bittern Liquid,<br>0.18% Triethanolamine | 135.6 |
| 95.0% Bittern Liquid,<br>5.0% Triethanolamine | 142.1 |
| 95.0% Bittern Liquid<br>5.0% Sodium Citrate | 139.7 |
| 95.0% Bittern Liquid,<br>2.5% Triethanolamine<br>2.5% Sodium Citrate | 137.0 |

Again, the combination of bittern liquid with triethanolamine, sodium citrate or combinations of triethanolamine and sodium citrate over a range of levels provided excellent corrosion protection to steel when compared to salt.

EXAMPLE III

Antiscaling tests were performed by pouring concrete samples into 1000 mL beakers and proceeding with the tests as follows. The concrete was allowed to cure for 28 days. This was followed by the addition of 5% by weight deicer solutions or water to each beaker such that 1″ of liquid remained on the surface. In the test below the samples were frozen and thawed once each day for 5 days each week. At the end of each week the liquid was carefully decanted and more of the same type of liquid replaced, again maintaining the 1″ liquid level. At the end of the test period the scaled concrete was removed from the surface of each sample by washing the concrete into a filter paper. Each deicer solution or water sample was performed in duplicate. After filtering the concrete the samples were dried in an oven and the concrete weighed. The duplicate weights were averaged.

| Deicer Composition | Average Weight of Scaled Concrete |
| --- | --- |
| Plain Water | 0.98 |
| Plain Salt | 46.40 |
| 00.357% Triethanolamine,<br>99.63% Liquid Bittern | 2.01 |
| 0.294% Sodium Citrate,<br>99.706% Liquid Bittern | 3.45 |
| 0.15% Sodium Citrate,<br>0.18% Triethanolamine,<br>99.67% Liquid Bittern | 3.58 |
| 0.15% Sodium Citrate,<br>0.18% Triethanolamine,<br>99.67% Magnesium chloride Hexahydrate | 17.1 |

Thus, combination of liquid bittern with sodium citrate, triethanolamine, or sodium citrate and triethanolamine produced excellent scaling protection when compared to salt. The use of magnesium chloride in place of liquid bittern with sodium citrate and triethanolamine did not perform as well but significant protection against concrete scaling still resulted.

Although the invention has been described with regard to its preferred embodiments, it should be understood that various changes and modifications as would be obvious to one having ordinary skill in this art may be made without departing from the scope of the invention which is set forth in the claims appended hereto.

The various features of this invention which are believed to be new are set forth in the following claims.

What is claimed is:

1. A liquid composition consisting essentially of from about 95 to about 99.9 weight percent of a deicer selected from the group consisting of liquid bittern and aqueous $MgCl_2$, the aqueous $MgCl_2$ consisting essentially of about 34 weight percent $MgCl_2$ based upon the weight of the aqueous $MgCl_2$; and from about 0.1 to about 5.0 weight of an organic inhibitor selected from the group consisting of triethanolamine, a triethanolamine acid salt, citric acid, an alkali metal salt of citric acid and mixtures thereof.

2. A liquid deicing composition as recited in claim 1 wherein the deicer is an aqueous solution of $MgCl_2$.

3. A liquid deicing composition as recited in claim 1 wherein the deicer is liquid bittern.

4. A liquid deicing composition as recited in claims 2 or 3 wherein the organic inhibitor is triethanolamine hydrochloride.

5. A liquid deicing composition as recited in claims 2 or 3 wherein the organic inhibitor is sodium citrate.

6. A liquid deicing composition consisting essentially of from about 95 to about 99.9 weight percent liquid bittern and from about 0.1 to about 5.0 weight percent organic inhibitor selected from the group consisting of triethanolamine, a triethanolamine acid salt, citric acid, an alkali metal salt or citric acid and mixtures thereof.

7. A liquid deicing composition as recited in claim 6 wherein the organic inhibitor is triethanolamine hydrochloride.

8. A liquid deicing composition as recited in claim 6 wherein the organic inhibitor is sodium citrate.

9. A liquid deicing composition consisting essentially of from about 95 to about 99.9 weight percent aqueous $MgCl_2$, the aqueous $MgCl_2$ consisting essentially of about 34 weight percent $MgCl_2$ based upon the weight of the aqueous $MgCl_2$; and from about 0.1 to about 5.0 weight percent organic inhibitor selected from the group consisting of triethanolamine, a triethanolamine acid salt, citric acid, an alkali metal salt of citric acid and mixtures thereof.

10. A liquid deicing composition as recited in claim 9 wherein the organic inhibitor is triethanolamine hydrochloride.

11. A liquid deicing composition as recited in claim 9 wherein the organic inhibitor is sodium citrate.

12. A method of deicing a surface with frozen water thereof, the method comprising applying a deicing composition consisting essentially of from about 95 to about 99.9 weight percent of a deicer selected from the group consisting of bittern liquid and aqueous $MgCl_2$, the aqueous $MgCl_2$ consisting essentially of about 34 weight percent $MgCl_2$ based upon the weight of the aqueous $MgCl_2$; and from about 0.1 to about 5.0 weight percent organic inhibitor, the organic inhibitor selected from the group consisting of triethanolamine, a triethanolamine acid salt, citric acid, an alkali metal salt or citric acid and mixtures thereof.

13. A method as recited in claim 12 wherein the deicer is an aqueous solution of $MgCl_2$.

14. A method as recited in claim 12 wherein the deicer is liquid bittern.

15. A method as recited in claims 12, 13, or 14 wherein the organic inhibitor is triethanolamine hydrochloride.

16. A method as recited in claims 12, 13, or 14 wherein the organic inhibitor is sodium citrate.

* * * * *